United States Patent [19]

Pirkle

[11] 4,438,777
[45] Mar. 27, 1984

[54] FREEZE PROTECTION VALVE WITH IMPROVED RESETTING CAPABILITY

[76] Inventor: Fred L. Pirkle, Controls Consulting Company, R.D. 2, Box 353, Phoenixville, Pa. 19460

[21] Appl. No.: 490,153

[22] Filed: Apr. 29, 1983

[51] Int. Cl.$^3$ ............................................. E03B 7/12
[52] U.S. Cl. ...................................... 137/62; 137/80; 137/468; 236/90; 237/80; 251/11; 251/67; 251/74; 251/294; 251/297
[58] Field of Search ...................... 137/59, 61, 62, 79, 137/80, 468; 236/42, 43, 48 R, 90; 237/80; 251/11, 66, 67, 74, 75, 294, 297

[56] References Cited

U.S. PATENT DOCUMENTS

| | | | |
|---|---|---|---|
| 1,849,491 | 3/1932 | Kelley | 137/61 |
| 2,264,655 | 12/1941 | Brackmann | 251/74 |
| 2,547,853 | 4/1951 | Butterfield | 251/66 |
| 2,688,460 | 9/1954 | Borgerd | 137/62 |
| 2,716,418 | 8/1955 | Borgerd | 137/61 |
| 2,822,693 | 2/1958 | Mulsow | 137/62 |
| 3,040,772 | 6/1962 | Todd | 251/297 |
| 3,115,330 | 12/1963 | Dollison | 251/74 |
| 4,026,465 | 5/1977 | Kenny | 236/48 R |
| 4,361,167 | 11/1982 | Harasewych | 137/62 |
| 4,398,553 | 8/1983 | Perrine | 251/74 |

FOREIGN PATENT DOCUMENTS 698504 10/1953 United Kingdom .................. 137/79

OTHER PUBLICATIONS

Ogontz Controls Company "Self-Contained Fluid Temperature Sensing Valves"-Industrial Division-Bulletin F-200.

Primary Examiner—George L. Walton
Attorney, Agent, or Firm—Howson and Howson

[57] ABSTRACT

A freeze protection valve can be reset under cold ambient conditions without the need for artificial heating of the valve's temperature sensor. An auxiliary latch is used to hold the valve element closed. The auxiliary latch is automatically released as the primary latching mechanism of the valve becomes operative upon an increase in temperature of the liquid system served by the valve. Release of the auxiliary latch is effected by virtue of a small downward movement of the valve stem resulting from a camming action inherent in the operation of the valve's primary latch.

In one version of the valve, a simple, drop-away key temporarily holds the valve stem down until the primary latch becomes operative. In another version, the valve stem is reset remotely through a bowden wire, and the resetting mechanism automatically engages an auxiliary latch.

7 Claims, 3 Drawing Figures

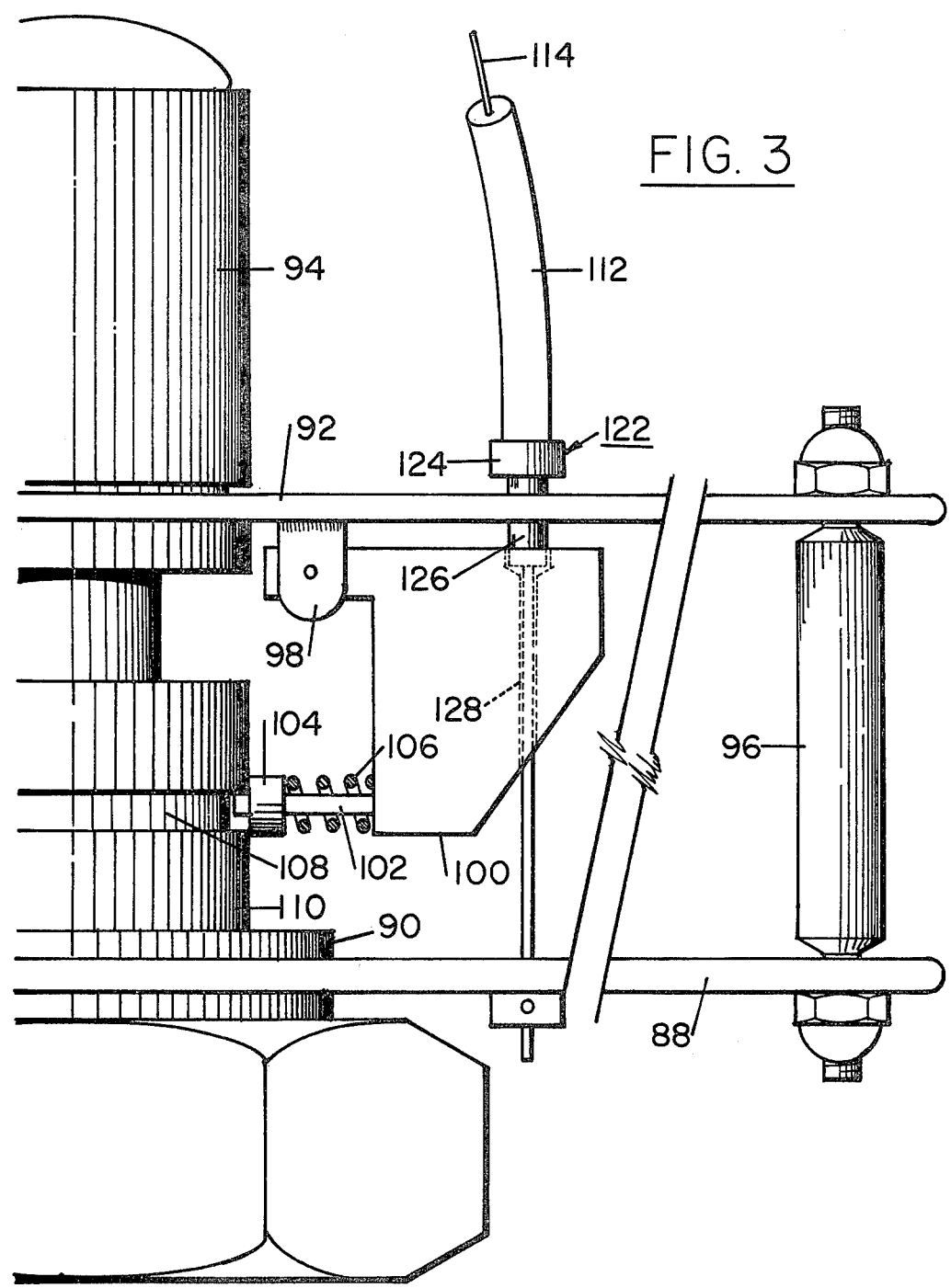

FREEZE PROTECTION VALVE WITH IMPROVED RESETTING CAPABILITY

BRIEF SUMMARY OF THE INVENTION

This invention relates to freeze protection valves, and more specifically to an improved freeze protection valve having a novel mechanism for effecting resetting of the valve under cold ambient conditions.

A typical use for a freeze protection valve is in the protection of the cooling water system of a railroad locomotive against damage from freezing temperatures. It is common practice to provide a railroad locomotive cooling water system with one or more temperature-responsive valves which open when the ambient temperature becomes low enough to threaten damage due to freezing of the cooling water. These valves open automatically as the temperature approaches freezing, and drain water from the cooling system. Since railroad locomotives are typically in continuous operation over long periods of time, it is practical to use these valves for freeze protection instead of providing antifreeze compounds in the cooling system.

A freeze protection valve suitable for railroad locomotive use is described in my copending U.S. application Ser. No. 460,927, filed Jan. 25, 1983. The entire disclosure of the copending application is incorporated by reference.

There are, of course, various other freeze protection valves for locomotive use. Furthermore, other uses exist for freeze protection valves, such as in chemical manufacturing plants, heating systems for buildings, shipboard and land-based power plants and fire protection systems.

A typical freeze protection valve is of the "snap-action" type, and comprises a valve element which is held closed by a latch, and urged open by a spring. The latch is triggered to its released condition by a temperature-sensing element, which may be a wax-filled thermal actuator.

A wax-filled thermal actuator, or "wax actuator", comprises an actuator body filled with a hydrocarbon wax specially formulated to change from solid to liquid or from liquid to solid gradually over a predetermined temperature range. As the wax changes from solid to liquid, its volume increases. The increase in volume produces movement of an actuator piston which extends outwardly from the actuator body. Motion is transmitted from the wax to the piston through a rubber plug situated in the neck of the actuator body. In operation, as the temperature increases, the wax melts, and the piston is extended. When temperature is reduced, the wax resolidifies and contracts in volume, and the piston can be pushed back into the actuator body by an external spring.

After a cooling water system is dumped by a freeze protection valve or a system of such valves, the valves must be reset before the water system is refilled. A typical freeze protection valve cannot be readily reset under cold ambient conditions. The reason for this is that, when the temperature sensor is cold, the latch will not operate to hold the valve element in its closed condition. Consequently, it is conventional practice to prepare freeze protection valves for resetting by warming the temperature sensors artificially. This is done by pouring hot water over the valves, or by heating the valves by any of a variety of available heating devices such as fusees, blow torches, cigarette lighters, or electrical heating devices. Heating freeze protection valves to prepare them for resetting is, of course, very inconvenient, especially where a system has multiple valves, and where the valves are in locations which are not easily accessible.

The principal object of this invention is to provide means whereby a freeze protection valve can be easily and readily reset under cold ambient conditions without the need for artificial heating. It is an object of the invention to provide a simple and inexpensive device for facilitating resetting of freeze protection valves. It is also an object of the invention to provide for the convenient and reliable resetting of freeze protection valves situated in locations which are not easily accessible.

In accordance with the invention, an auxiliary latching device is used for holding the valve element closed during the period following resetting but preceding the time at which the temperature sensing device causes the primary latch to become operative. Means are provided for conducting heat from the water system to the temperature sensing device, and for releasing the auxiliary latch automatically when the temperature-sensing device causes the primary latch to become operative.

If the valve is of the kind described in my copending application, the auxiliary latch may be a very simple metal key having two projections, one of which projects into a groove in the rising stem of the valve, and the other of which projects into a groove in the stationary part of the valve neck. The primary latch is a ball-detent latch having camming surfaces which automatically cause the rising stem to move downwardly a short distance when the primary latch engages. The downward movement of the rising stem causes the metal key to drop off, so that the valve is set and ready to open automatically the next time the water system is in danger of freezing.

In an alternative version of the invention, the valve stem is reset by a manual remote control which automatically sets an auxiliary latch for holding the valve element closed during the period following resetting and before the temperature-sensing device causes the primary latch to become operative. When the manual resetting control is released, the auxiliary latch is held by friction or by a catch surface, and is released by a spring when the valve stem moves downwardly upon reengagement of the primary latch.

Various further objects and advantages of the invention as well as details thereof will be apparent from the following detailed description when read in conjunction with the drawings.

BRIEF DESCRIPTION OF THE DRAWINGS

FIG. 3 is an elevational view showing the upper portion of the valve of FIG. 2 in its closed condition, with the auxiliary latch in its latched condition.

DETAILED DESCRIPTION

Figure 1:
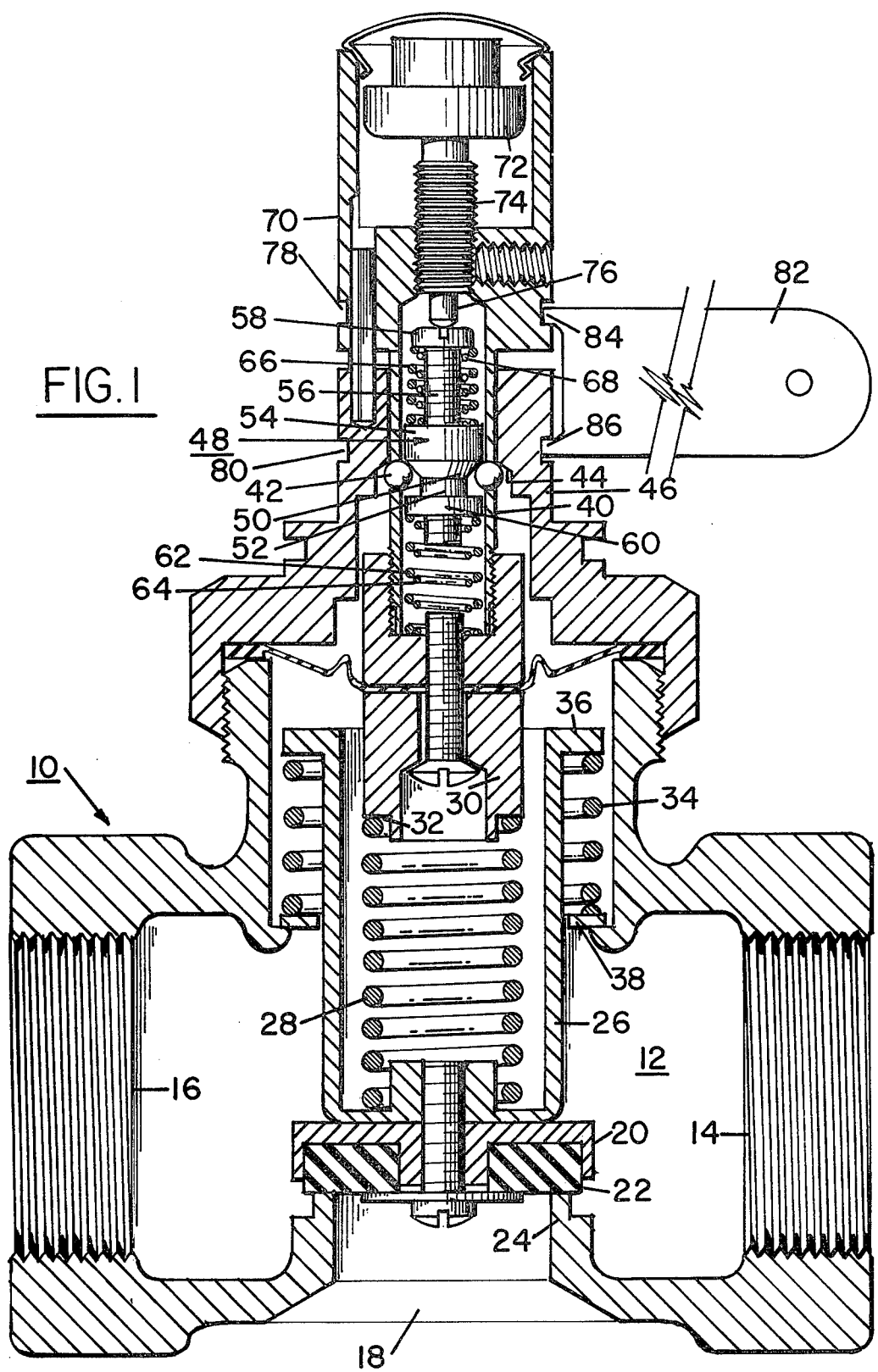
FIG. 1 is a vertical section through a freeze protection valve having an auxiliary latch key in accordance with the invention.

Referring to FIG. 1, the freeze protection valve 10 comprises a valve chamber 12 having ports 14 and 16 for connection to a liquid system, and a drain port 18 closed by a valve element 20. The valve has a resilient plug 22 cooperating with valve seat 24 surrounding the drain port. The valve element is secured to a cage 26 which is held down by a spring 28 located between the bottom of cage 26 and a valve stem element 30, the spring being engaged with surface 32 on the underside of element 30. A spring 34, surrounding cage 26, is held between flange 36 on the upper end of cage 26 and a ring 38 which sits on a ledge in the valve body. Spring 34 continuously urges the valve element in the opening direction. Springs 28 and 34 are designed so that spring 28 holds the valve element closed when stem element 30 is in the position shown, but allows spring 34 to open the valve element when stem element 30 moves upwardly through a short distance. Spring 28 allows the valve stem to move downwardly slightly beyond the position in which the valve element initially closes. (Such movement of the valve stem is inherent in the operation of the primary latch and, as will become apparent, advantage is taken of this characteristic movement because it effects automatic release of the auxiliary latch when the primary latch is engaged.) Spring 28, however, is not necessary in all valves. For example, if the valve plug 22 is sufficiently resilient, spring 28 can be eliminated and replaced by a rigid connection.

Cage 40 is part of the valve stem, and is rigidly connected to element 30. Cage 40 is generally in the shape of a hollow cylinder having radial holes through its wall. An array of detent balls 42 is arranged in a ring, and the balls are held in the radial holes in the wall of cage 40. When balls 42 move radially outwardly through these holes, they can engage frusto-conical latching surface 44 in a valve neck 46, which is threaded onto the valve body. The balls and surface 44 are the principal parts of the valve's primary latch. Heat is conducted from the liquid system through neck 46 to cage 40, and thence to an actuator carrier at the upper end of cage 40. For the purpose of heat conduction, cage 40 and the neck are in contact with each other over a substantial area, at least when the valve is in the closed condition.

Cam 48 is vertically slidable within cage 40 and has a downwardly facing frusto-conical camming surface 50 which is capable of engaging latching balls 42 and forcing them outwardly underneath latching surface 44. Camming surface 50 is steeper than latching surface 44, surface 50 preferably being at an angle of about 45 degrees with respect to the valve stem axis while latching surface 44 is preferably at an angle of about 75 degrees with respect to the valve stem axis. Thus, when cam 48 moves downwardly and pushes the balls outwardly against surface 44, the action of the balls against surface 44 causes the valve stem to move downwardly through a short distance. This slight downward movement of the valve stem is important for the release of the auxiliary latch as will become apparent.

Cam 48 also has a small diameter cylindrical surface 52 providing clearance for inward movement of the detent balls, and a large diameter cylindrical surface 48, which is almost equal to the internal diameter of cage 40, and which holds the balls outwardly against latching surface 44 when the latching mechanism is fully engaged, allowing the cam to continue to move downwardly in response to temperature changes.

Cam 48 is vertically slidable on a threaded stem 56 which is situated inside cage 40, and which has a head 58. A stop flange 60 is threaded onto stem 56 and is engageable by the lower end of cylindrical part 52 of cam 48 to limit the downward movement of the cam relative to stem 56. The position of flange 60 on threaded stem 56 can be adjusted to determine the lower limit of cam movement. Springs 62 and 64 bear upwardly against flange 60. Springs 66 and 68 are in compression between head 58 on stem 56 and the top of cam element 54. These springs urge the cam element downwardly. The mechanism just described allows a thermal actuator to push downwardly against head 58 of threaded stem 56 while the valve is open and the detent balls 42 are in engagement with the cylindrical inner wall of neck 46 so that they prevent cam 48 from moving downwardly. The ability of stem 56 to be pushed downwardly without corresponding movement of the cam prevents damage to the actuator under high temperature conditions when the valve is open.

The actuator carrier at the upper end of cage 40 is indicated at 70, and comprises a housing at least partly surrounding an actuator. The actuator has a body 72 and a threaded stem 74 from which extends downwardly a piston 76 in engagement with head 58 on threaded stem 56. Near the lower end of the actuator carrier, an external annular groove 78 is provided. A similar groove 80 is provided near the upper end of neck 46. The auxiliary latch is a key 82, which is a simple, flat metal stamping, typically about 1/16 inch in thickness, having an upper projection 84 and a parallel lower projection 86. Upper projection 84 engages the lower surface of groove 78, and projection 86 engages the upper surface of groove 80. So long as the projections of the key are in engagement with the grooves, the valve stem cannot move upwardly, and the valve element remains closed regardless of the condition of cam 48 and detent balls 42.

The operation of the valve of FIG. 1 is briefly as follows. First assuming that the auxiliary latching key is not present, and that the valve is latched closed by the full engagement of detent balls 42 with latching surface 44, a reduction in ambient temperature will have no effect on the valve provided that the liquid system is warm. This is because heat from the liquid system is conducted to the actuator housing, and protects the actuator from changes in ambient temperature. However, if the liquid system cools, a reduction in ambient temperature will allow actuator piston 76 to retract. Springs 62 and 64, acting against flange 60 assist in causing the actuator piston to retract. Before the actuator piston retracts, the balls are in engagement with the cylindrical surface of cam part 54. However, as the cam is moved upwardly by flange 60, detent balls 42 clear surface 54, and begin to move inwardly against frusto-conical surface 50. As soon as the balls clear latching surface 44, the valve stem snaps upwardly under the action of spring 34, and the valve opens.

The valve cannot be immediately reset to the closed condition because the actuator is still cold, and its piston 76 is retracted. Pushing down manually on the top of the valve stem, i.e. on the actuator carrier itself, closes the valve only as long as the actuator stem is held down manually. The latching mechanism will not engage until the actuator becomes warm and the actuator again extends. This may be accomplished by artificial heating of the actuator, for example by pouring hot water over the valve. Artificial heating can be carried out with the valve in the opened condition, because threaded stem 56 can move downwardly while cam 48 remains fixed against the detent balls held inwardly by the neck. As soon as the actuator is sufficiently warmed, it can be pushed down manually, and the detent balls will automatically be pushed out and underneath latching surface 44 by cam 48. The valve will then remain latched. This latching procedure, is not entirely satisfactory, because of the need for artificial heating of the actuator.

In accordance with the invention, it is unnecessary to heat the actuator housing artificially, because key 82 can be used to hold the valve closed temporarily until heat conducted from the liquid system, or ambient heat, causes the detent balls to engage latching surface 44.

When the valve is open and the actuator is cold, the valve stem can be manually pressed downwardly, and key 82 manually set in place with its projections 84 and 86 respectively in engagement with grooves 78 and 80. When the key is set in place, the manually applied downward force on the valve stem is released, and the key itself holds the valve closed. This allows the liquid system to be refilled. When the liquid system warms up, heat is conducted through the valve body, the neck, cage 40 and actuator carrier 70 to the actuator. The actuator may also be heated by a natural rise in ambient temperature if such a rise happens to occur. In any event, when the actuator warms up, its piston 76 extends, and a downward force is exerted on cam 44 through springs 66 and 68. This downward force is converted by frusto-conical cam surface 50 to an outward force against detent balls 42. The outward force of the balls acting against surface 42 is in turn converted to a downward force exerted through the balls against cage 40, with a resultant slight downward movement of cage 40 due to the slope of surface 44. This slight downward movement causes grooves 78 and 80 to move toward each other. Key 82, which was held by friction in grooves 84 and 86, falls away by gravity. However, since detent balls 42 are at this time held in engagement with latching surface 44 by cam 48, the primary latching mechanism holds the valve in the closed position and the auxiliary latch key is no longer needed. The auxiliary latch key 82 is very inexpensive, so that no significant loss occurs if it is not recovered after it falls away.

From the foregoing, it will be seen that the use of an auxiliary latching key permits resetting of the valve under low temperature conditions without the need for auxiliary heating, and that the ability of the primary latch mechanism to move the valve stem downwardly a short distance when the temperature rises causes the key to fall away, thereby enabling the valve to effect a dump the next time temperatures drop and a danger of freezing of the liquid system arises. The principal advantage of the invention is that it simplifies resetting of the valve, and that it allows resetting to be effected by a simple manual operation merely involving pressing downwardly on the valve stem, and setting the key in place.

Figure 2:
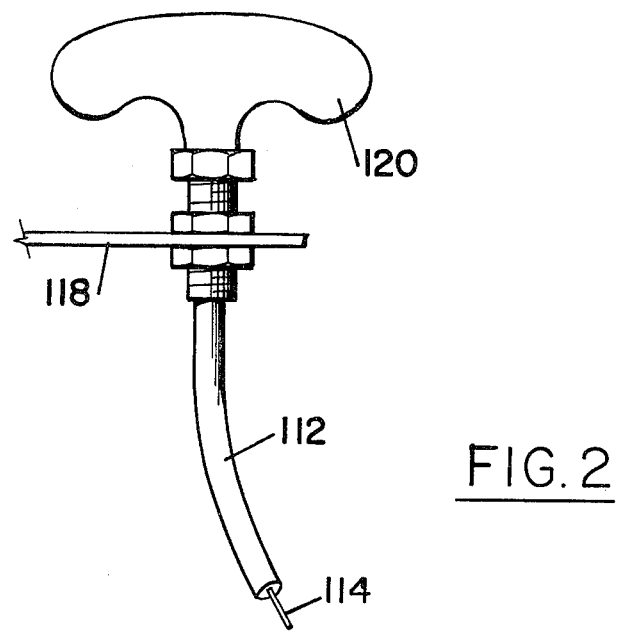
FIG. 2 is an elevational view showing the upper portion of a freeze protection valve equipped with a remote resetting means having a different form of auxiliary latch, the valve and latch being shown in their open conditions.
Figure 2:
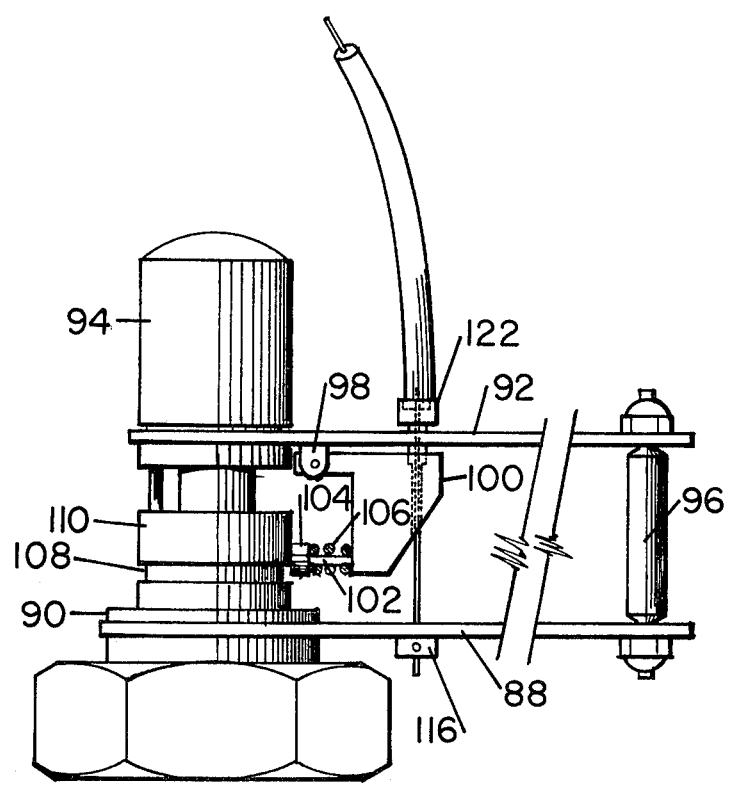

The version of the invention shown in FIGS. 2 and 3 is operationally similar to the version shown in FIG. 1. However, in FIGS. 2 and 3, provision is made for resetting of the valve mechanism by remote control. Heretofore, it was not possible to position freeze protection valves in certain locations because they could not be conveniently reached for resetting. This version of the invention makes it possible to position freeze protection valves in nearly inaccessible locations, and to effect resetting of these valves by remote control. The mechanism comprises a first plate 88 secured in a groove on neck part 90 by crimping, or by other suitable means of connection. It also comprises a second plate 92 which is similarly held in a groove on the actuator housing 94 of the valve, this groove corresponding to groove 78 in FIG. 1. The relationship between plate 92 and the grooves in which it is held should be such as to permit a slight degree of tilt of the plate with respect to the valve stem axis. The ends of plates 88 and 92 remote from the valve mechanism are connected by a pin 96 which has threaded extensions on its opposite ends, and nuts holding the plates on these threaded extensions. The purpose of pin 96 is simply to provide a pivot for plate 92. Accordingly, at least the upper plate 92 should be held loosely on the upper extension of pin 96.

Underneath plate 92, near the valve stem, there is provided a pair of hinge elements, one of which appears at 98, and the other of which is directly behind element 98 on the opposite side of rocker 100, which is pivoted on the hinge. Rocker 100 is a block having a pin 102 projecting from its lower end toward the valve neck. A collar 104 slides on pin 102, and is urged toward the valve neck by a coil spring 106 in compression between the collar and rocker 100. Pin 102 is designed to enter groove 108 in part 110 of the valve neck. Groove 108 corresponds to groove 80 in FIG. 1.

A bowden wire is provided for the remote resetting of the valve mechanism. The bowden wire comprises a sheath 112 and an internal wire 114. It should be long enough that it is not straight. The internal wire is connected at one end to an anchor 116 below plate 88, and at its opposite end to a handle 120 at a remote location. Sheath 112 is connected to a fixed plate 118 (typically a part of a locomotive body), and at its opposite end to a T-shaped bushing 122 having a head 124 and a stem 126 which slides vertically in a hole in plate 92. Stem 126 extends and fits loosely into a recess in rocker 100. Wire 114 extends downwardly from this recess through a hole 128 drilled in the rocker, so that it extends completely through the rocker and downwardly to anchor 116 below plate 88.

In operation, assuming that the valve is open, and in the condition depicted in FIG. 2, resetting of the valve is accomplished by pulling manually on resetting handle 120. Pulling on the handle tends to straighten wire 114 which, in turn, causes sheath 112 to push downwardly on bushing 122. Bushing 122, in turn, presses downwardly on block 100, urging it in the clockwise direction. The force transmitted by the bowden wire sheath is transmitted through block 100 and its hinge elements to plate 92, causing the valve stem to be pushed downwardly by plate 92. Thus, pulling on resetting handle effects closure of the valve. As soon as projection 102 is able to enter groove 108 in the valve neck, rocker 100 rotates clockwise, and projection 102 enters the groove. This is accompanied by compression of spring 106 as projection 102 moves into the groove through collar 104. Handle 120 can now be released, and the valve will be held closed by the latching relationship between projection 102 and groove 108. The operating spring of the valve pushes upwardly on the valve stem, causing a frictional force to exist between the upper surface of groove 108 and projection 102, thereby holding projection 102 in the groove despite the force of spring 106 which tends to rotate rocker 100 in the counterclockwise direction. However, as soon as the primary latch of the valve operates to cause a slight downward movement of the valve stem as the actuator warms, the accompanying downward movement of plate 92 releases the frictional relationship between projection 102 and the upper surface of groove 108. At this time, spring 106 rotates the rocker counterclockwise, causing projection 102 to clear groove 108. The valve can now operate to effect a dump as soon as a danger of freezing occurs.

Both versions of the invention depend on the conduction of heat from the liquid system to the temperature sensor, and the slight downward movement of the valve stem resulting from the camming action of the latching balls against the frusto-conical latching surface within the valve neck, in order to release the auxiliary latch. Of course, automatic release of the auxiliary latch can be achieved in response to a system temperature rise in various other ways, and therefore, the invention is applicable to freeze protection valves other than the one specifically shown and described.

Various modifications can be made in the latching mechanism. For example, element 82 can be permanently hinged to the valve neck if desired at the location where projection 86 enters groove 80 in FIG. 1. Alternatively, key 82 could be permanently hinged to the valve stem at the location at which projection 84 enters groove 78, provided that a provision is made for the automatic release of projection 86 from groove 80. This could be accomplished by using a mechanism similar to that illustrated in FIGS. 2 and 3, in which a spring 106 and collar 104 are provided on projection 102.

Various other modifications can be made to the valve in accordance with the invention without departing from the scope of the invention as defined in the following claims.

I claim:

1. A valve for use in draining a liquid system to prevent the system from freezing under low ambient temperature conditions comprising:

means providing a valve chamber connectable to the liquid system, said valve chamber having a drain outlet;

a valve element cooperating with said drain outlet and movable from a closed position in which it closes the drain outlet to an open position in which the drain outlet is opened;

means connected to the valve element for urging the valve element toward its open position;

first latch means for holding the valve element in its closed position, said first latch means being releasable to permit the valve element to move to its open position under the influence of the urging means;

a temperature sensor including a temperature sensing element and means responsive to the temperature sensing element for releasing the first latch means when the temperature of the sensing element falls below a predetermined level;

means for conducting heat from the liquid system to the temperature sensing element;

manually operable means, connected to the valve element, for effecting resetting movement of the valve element from its open position to its closed position against the influence of the urging means;

second latch means for holding the valve element in its closed position following resetting movement thereof when the temperature of the sensing element is below said predetermined level, said means responsive to the temperature sensing element also being operative to effect reengagement of said first latch means as the temperature of the sensing element increases while the valve element is held in its closed position by said second latch means; and means responsive to the temperature of the temperature sensing element for automatically releasing said second latch means after the temperature of the temperature sensing element reaches the level at which the first latch means becomes operative to hold the valve means in its closed position.

2. A valve according to claim 1 in which the valve element has a stem; in which the first latch means includes means for effecting a small movement of the valve stem in the closing direction as reengagement of the first latch means takes place; and in which the second latch means includes means for temporarily holding the stem in a position such that the valve element is closed, and means for releasing said holding means when said small movement of the valve stem takes place.

3. A valve according to claim 1 in which the valve element has a stem; in which the first latch means includes means for effecting a small movement of the valve stem in the closing direction as reengagement of the first latch means takes place; in which the second latch means includes a latching element engageable with the stem; and in which the stem includes means for retaining the latch element in engagement with the stem after manual resetting but before reengagement of the first latch means, and for releasing said latching element from engagement with the stem when said small movement of the valve stem takes place.

4. A valve according to claim 1 in which the valve element has a stem; in which the first latch means includes means for effecting a small movement of the valve stem in the closing direction as reengagement of the first latch means takes place; in which the second latch means includes an overhanging surface on the valve chamber providing means, a latching element carried by the stem and engageable with said overhanging surface, and means for releasing said latching element from engagement with said overhanging surface when said small movement of the valve stem takes place.

5. A valve according to claim 1 in which the manually operable means comprises remote control means for effecting resetting movement of the valve element by a manual operation at a remote location.

6. A valve according to claim 5 in which the remote control means also effects latching of said second latch means automatically whenever said remote control means is operated to effect resetting movement of the valve element.

7. A valve according to claim 1 in which the valve element has a stem; in which the first latch means includes means for effecting a small movement of the valve stem in the closing direction as reengagement of the first latch means takes place; and in which the second latch means comprises a support connected to the valve stem, a latching projection carried by said support, means providing an overhanging retaining surface, connected to the valve chamber providing means, and engageable by said latching projection for holding the valve element in its closed position; said manually operable means comprising remote control means for moving said support in a direction to effect closing movement of the valve element, and for moving said latching projection to a position underneath said overhanging retaining surface for engagement therewith, whereby said latching projection automatically engages the overhanging retaining surface as said valve element is moved to its closed condition; said second latch means also comprising means for continuously urging said latching projection in a direction to disengage the retaining surface, whereby the latching projection automatically disengages the retaining surface, as said small movement of the valve stem in the closing direction takes place, to permit reopening of the valve element upon release of the first latch means.

* * * * *